United States Patent [19]

Arranaga

[11] Patent Number: 5,045,588

[45] Date of Patent: Sep. 3, 1991

[54] HIGH POLYMER SUSPENSION

[75] Inventor: Alexander B. Arranaga, Sierra Madre, Calif.

[73] Assignee: The United States of America as represented by the Secretary of the Navy, Washington, D.C.

[21] Appl. No.: 523,104

[22] Filed: Nov. 7, 1974

Related U.S. Application Data

[63] Continuation-in-part of Ser. No. 252,932, May 8, 1972, abandoned.

[51] Int. Cl.$^5$ .......................... C08K 3/34; C08K 5/19; C08K 9/04
[52] U.S. Cl. .................................. 524/445; 114/20.1; 114/67 R; 137/13; 252/2; 252/315.2; 524/446
[58] Field of Search .................... 252/2, 316, 315.2; 260/39 SB, 41.5 A; 114/20 R, 67 R; 524/445, 508, 446

[56] References Cited

U.S. PATENT DOCUMENTS

| | | | |
|---|---|---|---|
| 3,021,234 | 2/1962 | Casement et al. | 427/116 X |
| 3,329,635 | 7/1967 | Miranda | 260/22 |
| 3,567,574 | 3/1971 | Braitberg et al. | 162/70 |
| 3,642,624 | 2/1972 | Howland et al. | 252/8.55 R |
| 3,720,216 | 3/1973 | Wartman et al. | 252/8.55 R |
| 3,755,166 | 8/1973 | Abbott et al. | 252/21 X |

OTHER PUBLICATIONS

Afremow et al., J. Paint Technol., vol. 38, No. 495, pp. 169 to 171, Apr. 1966 TP934F29.

Primary Examiner—Richard D. Lovering
Attorney, Agent, or Firm—Harvey Fendelman; Thomas Glenn Keough; Ervin F. Johnston

[57] ABSTRACT

A high polymer suspension including a polymer; a liquid carrier; a fibrous silicate material; and an organic derivative of clay. The polymer is preferably a polyacrylamide, the fibrous silicate material a chrysotile asbestos, and the organic derivative of clay, dimethylbenzloctadecyl ammonium hectorite.

19 Claims, 2 Drawing Sheets

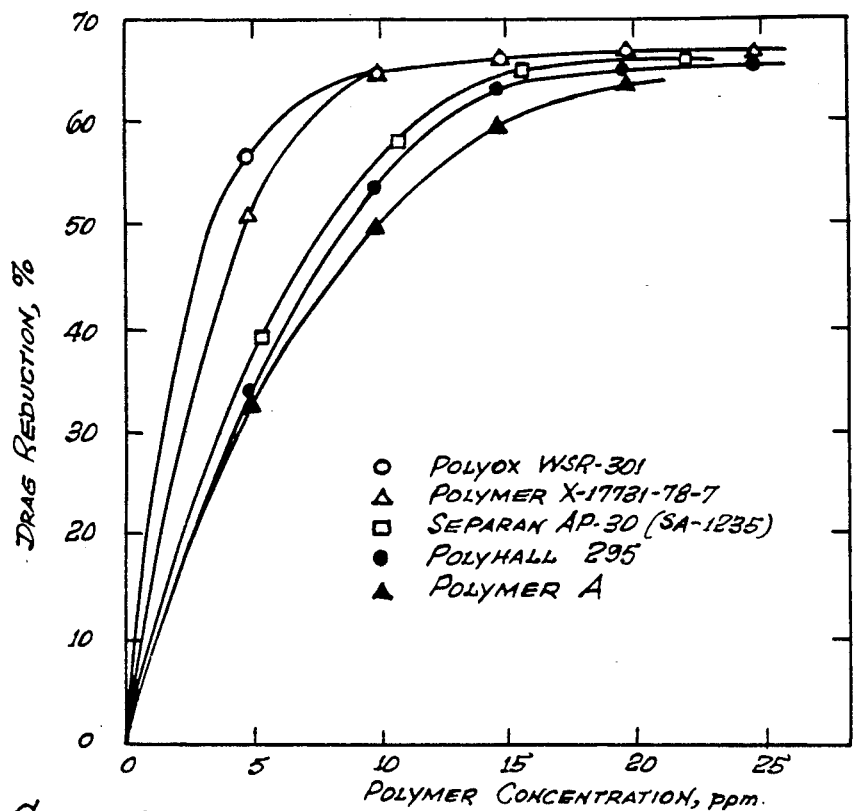
FIG. 1. DRAG REDUCTION OF VARIOUS POLYMERS IN DEIONIZED WATER.
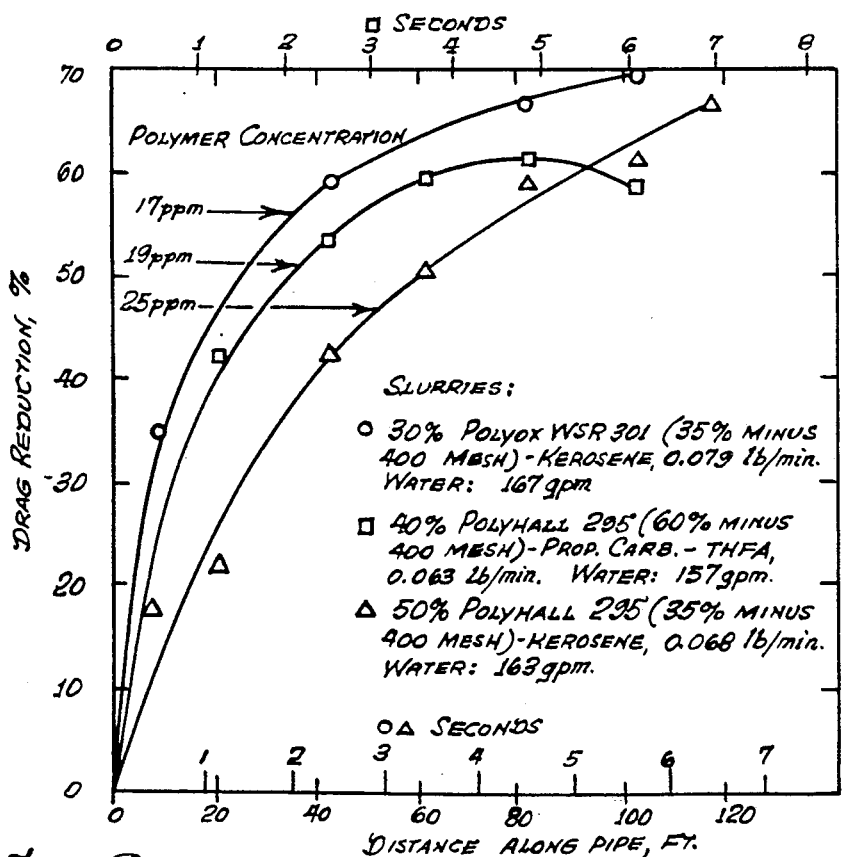
FIG. 2. DRAG REDUCTION AT LOW SLURRY AND WATER FLOW RATES.

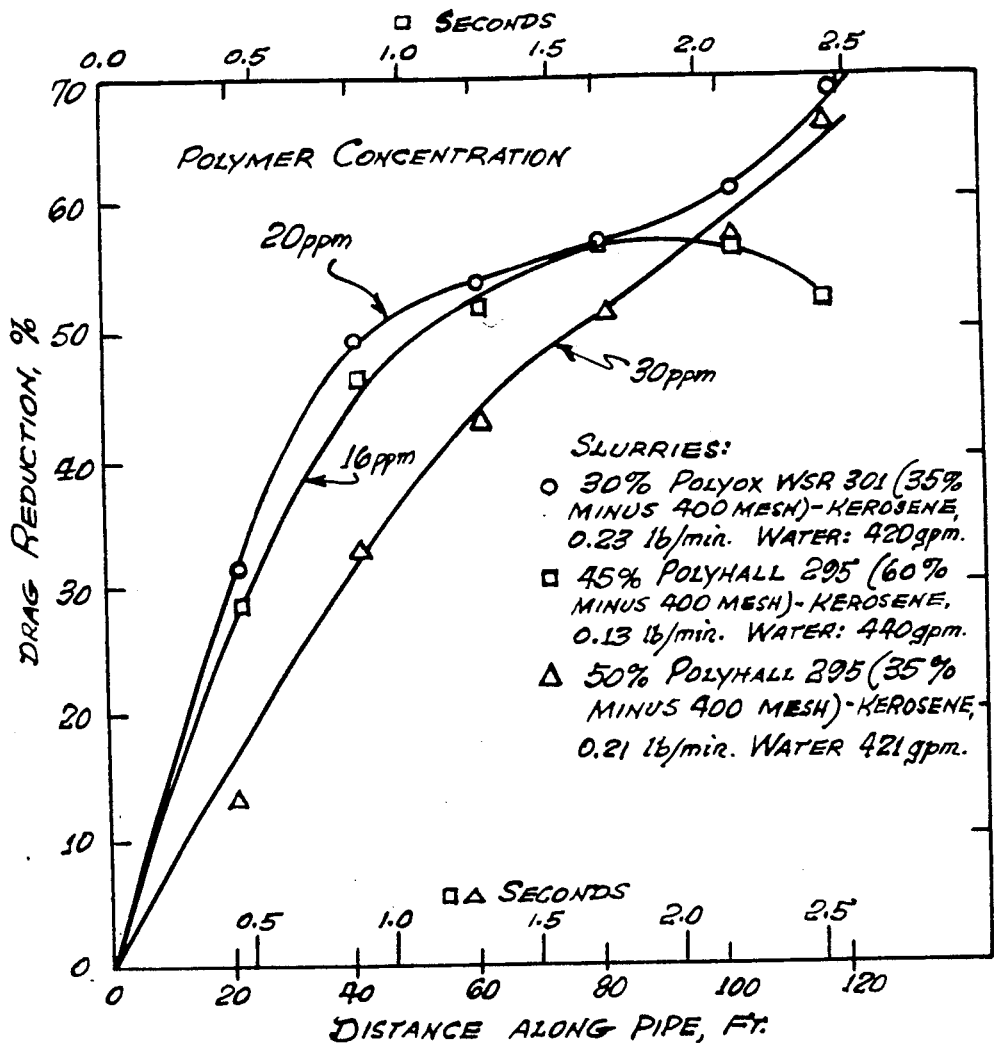
FIG. 3. DRAG REDUCTION AT HIGH WATER FLOW RATES.

HIGH POLYMER SUSPENSION

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATION

This application is a continuation-in-part of application Ser. No. 252,932 filed May 8, 1972; now abandoned.

BACKGROUND OF THE INVENTION

The present invention relates to a high polymer suspension (slurry) which may be used for reducing drag and/or noise of waterborne vehicles.

High speed water vehicles such as submarines and torpedoes, undergo a considerable amount of drag. Research has been and is still being conducted to reduce this drag by ejecting relatively small amounts of polymer suspension into the boundary layer at a forward portion of the vehicle. This technique also results in a reduction of noise as the vehicle traverses the water. The polymer is carried aboard the vehicle and is disseminated through small orifices in the nose of the vehicle as desired. Prior methods included carrying the polymer in premixed water solution or in powder form. The premixed polymer solution, which usually contains 0.1% to 1% polymer, has not been acceptable because of the excessively large space required for storage. The powder form of the polymer tends to produce lumps when it is put in contact with the water and it is limited in its application because it cannot be pumped into the water stream at depth pressure. Previous polymer suspensions have had several shortcomings, such as insufficient stability, clogging of the orifices, and expensive to produce.

SUMMARY OF THE INVENTION

The invention is a high polymer suspension which includes a polymer such as a polyacrylamide; a liquid carrier, a fibrous silicate material, such as chrysotile asbestos; and an organic derivative of clay, such as dimethylbenzyloctadecyl ammonium hectorite. The present invention is very stable, inexpensive, and retains a high percentage of polymer in suspension. The combination of the chrysotile asbestos and Bentone 27 results in a synergistic effect which gives the invention its high suspending capability, in the order of 30% to 50% of polymer by weight. The present suspension can be stored for long periods of time in a water vehicle and ejected through small orifices in the nose of the vehicle without clogging for quick dissemination in the water over the exterior surface of the vehicle. The present invention may also have use in fire fighting applications for producing an extremely long stream of water or for reducing pumping requirements.

OBJECTS OF THE INVENTION

An object of the invention is to provide a very stable, inexpensive, and high content polymer suspension which can be ejected through small orifices without clogging into a water stream for quick dissemination.

Other objects and many of the attendant advantages of this invention will be readily appreciated as it becomes better understood by reference to the description and accompanying drawings which follow.

BRIEF DESCRIPTION OF THE DRAWINGS

FIG. 1 illustrates the drag reduction of various polymers in deionized water, FIG. 2 illustrates drag reduction of various polymers at low water flow rates.

FIG. 3 illustrates drag reduction of various polymers at high water flow rates.

DESCRIPTION OF THE PREFERRED EMBODIMENTS

A polymer suspension (slurry) is obviously the most practical substance for underwater vehicle application providing it can be introduced directly into the boundary layer. Prior art suspensions did not flow satisfactorily through small orifices and clogging was the usual result. A drag reducing suspension contains basically (1) a water-soluble organic polymer; (2) a non-solvent liquid carrier; and (3) suspending agents. The preferred suspensions, described in examples hereinbelow, are as follows:

1. Polyacrylamide in water-soluble liquid;
2. Polyacrylamide in water-insoluble liquid;
3. Polyacrylamide in water-soluble liquid plus water insoluble liquid; and
4. Poly(ethylene oxide) in water insoluble liquid.

EXAMPLE 1

Polyacrylamide in Water-Soluble Liquid

| | |
|---|---|
| Polyacrylamide polymer | 35-40% |
| Propylene carbonate | 28-41% |
| Tetrahydrofurfuryl alcohol | 19-31% |
| Organic derivative of clay, such as dimethylbenzyloctadecyl ammonium hectorite | 1-3% |
| Chrysotile asbestos | 0.05-.5% |
| Dioctyl sodium solfosuccinate (Aerosol OT) | 0.1-.3% |

In making this suspension, the propylene carbonate and tetrahydrofurfuryl alcohol are weighed into the mixing container. Next, Aerosol OT (predissolved in some of the alcohol) is added. At this point, a defoamer may be introduced. The clay is then added. This combination is then mixed until the dispersion is free of large lumps. A notched disk mixer can be used for this purpose. Next, the chrysotile asbestos is added. All of these ingredients are then mixed with a high shear mixer at maximum speed to produce a gel. The required mixing period depends on the volume being mixed and can be determined by viscosity measurements on samples withdrawn at successive intervals. An indication of maximum viscosity signifies an adequate mixing period. When maximum viscosity is reached, the gel temperature will be approximately 60° to 65°. The gelled liquid is then allowed to cool to any convenient handling temperature. The gelled liquid may then be deaerated if desired. Next, the polyacrylamide polymer is dispersed in the gelled liquid by means of a low or medium shear mixer. Finally, the slurry is deaerated, strained, and stored in a moisture tight container.

When a Gifford-Wood Homo-Mixer model 2-L (½ hp) is used for the high shear mixing operation mentioned hereinabove, a one gallon batch is mixed approximately 15 minutes and a ten gallon batch is mixed 2 hours.

EXAMPLE 2

Polyacrylamide in Water-Insoluble Liquid

| | |
|---|---|
| Polyacrylamide polymer | 45–55% |
| Aliphatic hydrocarbon liquid boiling within 150°–325° C., such as kerosene | 39–49% |
| Organic derivative of clay, such as dimethylbenzyloctadecyl ammonium hectorite | 2–3.5% |
| Chrysotile asbestos | 0.05–.5% |
| Wetting agent, such as an alkylphenyl-hydroxypolyoxyethylene (Tergitol NP-14) or dioctyl sodium sulfosuccinate | 2–3% |

In preparing this suspension, the kerosene is first weighed into the mixing container. A defoamer may then be added. Next, the clay is added and mixed until the dispersion is essentially free of lumps. The chrysotile asbestos is then mixed in. All of these ingredients are then mixed with a high shear mixer, such as a Gifford-Wood Homogenizer-Mixer, at maximum speed until maximum viscosity is developed. The gel temperature will reach approximately 60° to 65° C. The substance is allowed to cool to reduce excessive vaporization at the surface, then the wetting agent is added. The mixing is then resumed and continued until maximum viscosity is developed. This will take approximately 5 to 10 minutes when starting with a warm gel and can be accomplished at a reduced mixer speed. The gel is then allowed to cool to a convenient handling temperature and deaerated if necessary. The polyacrylamide is then dispersed in the gelled kerosene by using a low or medium shear mixer. Finally, the suspension is deaerated, strained and stored.

EXAMPLE 3

Polyacrylamide in Water-Soluble Liquid plus Water-Insoluble Liquid (EMULSION TYPE)

| | |
|---|---|
| Polyacrylamide polymer | 35–40% |
| Propylene carbonate | 54–59% |
| Organic derivative of clay, such as dimethylbenzyloctadecyl ammonium hectorite | 1–2.5% |
| Chrysotile asbestos | 0.05–.5% |
| Aliphatic hydrocarbon liquid boiling within 150° to 325° C., such as kerosene | 2–3% |
| Emulsifying agent, such as an alkylphenyl-hydroxypolyoxyethylene (Tergitol NP-14) or dioctyl sodium sulfosuccinate | 0.5–1% |

In the preparation of this suspension, the propylene carbonate is weighed into a mixing container. A defoamer may then be introduced. The clay is added and mixed until the dispersion is free of large lumps. Next, the chrysotile asbestos is added. All of these ingredients are then mixed with a high shear mixer at maximum speed until maximum viscosity is developed. The gel is cooled to any convenient handling temperature and deaerated if necessary. The polyacrylamide polymer is then dispersed in the gelled liquid using low or medium shear mixing. Next, the resulting slurry is dispersed in kerosene containing the emulsifying agent by using medium shear mixing. A notched disk mixer can be used for this purpose. A "building block" technique is preferable in dispersing the polymer slurry in the kerosene. According to this technique, each portion of polymer slurry to be added is always kept smaller than the amount of emulsion slurry already made. Thus, the size of each successive portion to be added can be gradually increased to speed up the mixing process. Finally, the slurry is deaerated, strained, and stored.

EXAMPLE 4

Poly(ethylene oxide) in Water-Insoluble Liquid

| | |
|---|---|
| Poly(ethylene oxide) polymer, such as Polyox WSR-301 | 25–35% |
| Aliphatic hydrocarbon liquid boiling within 150° to 325° C., such as kerosene | 58–70% |
| Organic derivative of clay, such as dimethylbenzyloctadecyl ammonium hectorite | 1.5–2.5% |
| Chrysotile asbestos | 0.05–.5% |
| Wetting agent, such as an alkylphenyl-hydroxypolyoxyethylene (Tergitol NP-14) | 2–4% |

The procedure is the same as for Example 2 except that Polyox WSR-301 is used instead of polyacrylamide, and the Polyox and gelled kerosene are cooled to 25° C. before mixing together. Finally, the slurry is deaerated, strained (through 0.040 inch orifices) and stored.

POLYMERS

The polymers which had the best combination of properties for the suspensions were the polyacrylamides. Polyacrylamide suspensions (slurries) are illustrated in Examples, 1, 2, and 3. Polyacrylamides evaluated in slurry form were Separan AP-30 made by Dow Chemical Company, Polyhall 295 made by Stein-Hall Company, Polymers A and X-17731-78-7 (later renamed "451-MD") manufactured by Hercules, Inc., and Nalcolyte 674, manufactured by Nalco Chemical Company. Of this group, Polyhall 295 and Separan AP-30 were the best performers. Polyox WSR-301 manufactured by Union Carbide Chemical Company was the only poly(ethylene oxide) evaluated in slurry form. Although the Polyox had excellent drag reducing properties, its use in slurries is limited by its tendency to dissolve or swell in organic liquids when it is subjected to temperatures higher than approximately 45° C.

FIG. 1 compares the drag reducing properties of some of the polymers mentioned above. The data was obtained by flowing the polymer solutions through a 0.046-in.-diameter by 5 in.-long steel tube at a Reynolds number of approximately 14,000. The test temperature was 21° C. to 22° C. Further tests illustrated that there was only a relatively slight drop in drag reducing effectiveness of the polymers in salt water as compared to their effectiveness in salt free water.

Separan AP-30 powder is not generally available in the required small particle size. The Nalcolyte 674 slurries showed serious susceptibility to degradation on aging. Polymer A and Polymer 451-MD slurries hydrated slowly in pipe flow experiments. Polyhall 295 had very good drag reduction properties and is readily available on the commercial market in the required small particle size. For these reasons, most of the experimental work was done with this polymer.

For greater suspension stability and in order to obtain the most rapid hydration rate possible when the polymer slurry contacts water, it is desirable to use polymer powders having a high percentage of the minus 400 mesh fraction. Most of the experiments were run with a Polyhall 295 powder containing 60% −400 mesh.

All of the experiments discussed herein were performed with non-dried polymers. The slurry polymer concentrations described hereinabove included the moisture which was present in the polymer as it was received from the manufacturer. A moisture content of 4% to 5% was not found to be detrimental.

LIQUID CARRIERS

In order to develop slurries with non-settling characteristics, it was found desirable to use liquid carriers with specific gravities approaching or equalling those of the polymers being suspended. The specific gravities of the polymers involved ranged from 1.2 to 1.5. Halogenated liquids were tried. However, it was found that these liquids had a solvent effect on the polymers. An exception was a chlorofluorocarbon oil, when used with polyacrylamide polymers. The extremely high cost of this oil limits its usefulness, however.

The search for a water soluble liquid having a high specific gravity, a high boiling point, a low freezing point, a low viscosity, and low cost leads to propylene carbonate (specific gravity 1.2) for use with polyacrylamide polymers. Tetrahydrofurfuryl alcohol (specific gravity 1.05), used by itself, was less effective in producing stable suspensions. Optimum slurry properties were obtained when the propylene carbonate and tetrahydrofurfuryl alcohol (THFA) were used together in a weight ratio of 2:1 or 1:1, carbonate to alcohol. Other high density materials that can be substituted for tetrahydrofurfuryl alcohol are polypropylene glycol 400, ethylene carbonate, sulfolane, 3-Methylsulfolane, and tris (tetrahydrofurfuryl) phosphate.

Experimentation to develop a slurry of polyox WSR-301 in a water soluble liquid carrier with long term stability was unsuccessful. Propylene carbonate has a stronger solvent effect on Polyox than does tetrahydrofurfuryl alcohol. When the Polyox slurry is heated to 60° C., the ultimate result is fusion of the Polyox, regardless of the liquid used. If the Polyox slurry is not allowed to warm above 35° C. during storage, tetrahydrofurfuryl alcohol (or phosphate) may be used as a liquid carrier.

Despite its low specific gravity (0.8), kerosene is a promising liquid carrier for polyacrylamide polymers. For short term purposes it can also be used with Polyox WSR-301. A drawback with Polyox is that as the slurry ages, its viscosity increases (irreversibly) as a result of the swelling of the polymer in the kerosene. In Polyhall "water-in-oil" type emulsion slurries, where propylene carbonate served as the "water" or inner phase, kerosene performed satisfactorily as the oil phase. Equivalents of kerosene may be labelled commercially as "solvents," "fuel oils," or "coal oil."

SUSPENDING AGENTS

Even though the specific gravity of a liquid carrier may exactly match that of the polymers suspended in it, a homogeneous suspension cannot be maintained throughout a range of ambient temperatures. As the temperature rises, the density and viscosity of the liquid decrease, thus enabling previously suspended particles to settle. Moreover, some of the polymers have particles of slightly different specific gravities within the same batch. The inclusion of suspending agents (gelling agents) makes it possible to maintain at least a fair degree of homogeneity over a wide range of temperatures and specific gravities. It is also important to utilize suspending agents that will be effective when used in a minimum quantity, because as more suspending agent is added the polymer tends to dissolve more slowly when finally added to water. The use of a water soluble liquid carrier of high specific gravity (1.2 or over) makes it possible to use a total suspending agent content in the slurry not exceeding 3.5%. By using polypropylene glycol 400 in place of tetrahydrofurfuryl alcohol, it is possible to reduce the suspending agent content to 2.7% or less.

The best suspending agent found was a combination of dimethylbenzyloctadecyl ammonium hectorite and chrysotile asbestos. This combination is synergistic in that the combination works together to produce a beneficial result which is greater than the total of the results obtained when each of these ingredients is used individually (without the other). Slurries made with dimethylbenzyloctadecyl ammonium hectorite alone showed early settling and clogged repeatedly in the pipe flow experiments. Slurries made with chrysotile asbestos alone had excessive viscosity when sufficient chrysotile asbestos was added to prevent polymer settling. Since clogging is not a problem when dimethylbenzyloctadecyl ammonium hectorite and chrysotile asbestos are used together (orifices 0.030 in. or larger), it appears that chrysotile asbestos functions not only as a suspending agent but as a lubricant for the irregularly shaped polymer particles. Dimethylbenzyloctadecyl ammonium hectorite is an organic derivative of montmorillonite clay and can be purchased from the Baroid Division of National Lead Industries under the trademark "Bentone 27." Dimethylbenzyloctadecyl ammonium hectorite is an ion exchange reaction product of sodium hectorite with dimethylbenzyloctadecyl ammonium chloride. The equivalent weight of the sodium hectorite is approximately 1000. Therefore, 1 equivalent of the dimethylbenzyloctadecyl ammonium chloride is reacted with 1 kilo of the sodium hectorite to produce the dimethylbenzyloctadecyl ammonium hectorite. Further descriptions of producing organic derivatives of clays are found in U.S. Pat. No. 2,531,427 and U.S. Pat. No. 2,966,506. The chrysotile asbestos used in most of the work described in this disclosure was Avibest C, manufactured by Food Machiner Corporation. Other types of chrysotile asbestos that have been evaluated, with successful results, are RG-144 Calidria asbestos, made by the Union Carbide Corp., and Celluflo No. 10 asbestos, made by the Cellulo Company.

RESULTS OF TESTS

The hydration rate and drag reduction performance of the slurries were evaluated in a 143 ft. long straight and horizontal pipe having an inside diameter of 1.94 inches. The slurry was extruded through a narrow annular gap (0.030 in.) into a water stream at a point 20 ft. downstream from the water inlet. Wall shear stress was measured by means of pressure transducers located at several places along the pipe. Slurry flow rates were varied between 0.03 and 0.26 lb/min., and water flow rates between 150 and 450 GBm. The water utilized was from a fresh water lake and the water temperatures varied from between 15° C. and 21° C., although in most tests the water temperature was closer to 21° C. Reynolds numbers varied from 240,000 to 740,000.

Numerous slurry formulations were tested in the 143 ft. long pipe to determine the factors (such as ingredients and their percentages) most conducive to rapid hydration of the drag reducing polymer in the water stream. Summary results are shown in FIGS. 2 and 3. Generally, at least 80% of peak drag reduction was achieved within 1 to 2 seconds after slurry injection into the fresh water stream. Drag reduction is equivalent to reduction in wall shear stress. The most significant findings from these tests were as follows:

1. The drag reduction performance of Polyox WSR-301 was better than that of Polyhall 295 (see FIG. 2). However, the large increase in viscosity of Polyox-kerosene slurries upon aging limits their usefulness.

2. The finer the polymer particle size, the more rapid its hydration rate in the water stream.

3. On an overall basis, Polyhall 295 slurries made with propylene carbonate-tetrahydrofurfuryl alcohol liquid carrier showed slightly better drag reduction than those made with kerosene (see FIG. 3). The comparison was based on the use of 60% −400 mesh Polyhall 295.

4. If the waterflow rate was increased, and increase in the slurry flow rate was needed to maintain the previous magnitude of drag reduction at given distances along the pipe (see FIGS. 2 and 3).

5. By means of the pipe flow tests, it was possible to determine the effect of omitting certain ingredients from the slurry formulation. For example, when propylene carbonate was used without tetrahydrofurfuryl alcohol the slurry had a tendency to clog in the dispenser. The use of tetrahydrofurfuryl alcohol alone as a liquid carrier, that is, without propylene carbonate, led to early liquid separation (syneresis).

It is now readily apparent that the aforementioned polymer slurries, especially Examples 1, 2, and 3, provide unique combination of advantages, namely:

1. High stability;
2. Capable of satisfactorily flowing through small orifices; and
3. Excellent hydration rate when the slurry is ejected in a water stream.

The unique combination of dimethylbenzyloctadecyl ammonium hectorite and chrysotile asbestos as a suspending agent imparted highly desirable fluidity and suspending properties to the resulting suspension.

Obviously, many modifications and variations of the present invention are possible in the light of the above teachings. It is therefore to be understood that within the scope of the appended claims the invention may be practiced otherwise than as specifically described.

What is claimed is:

1. A non-reactive high polymer slurry suspension consisting of:
   polyacrylamide;
   a liquid carrier; and
   an organic derivative of clay.

2. A non-reactive high polymer slurry suspension as claimed in claim 1 wherein:
   said liquid carrier includes polypropylene glycol and propylene carbonate.

3. A non-reactive high polymer slurry suspension as claimed in claim 1 wherein:
   the organic derivative of clay is dimethylbenzyloctadecyl ammonium hectorite.

4. A non-reactive high polymer slurry suspension as claimed in claim 3 wherein:
   said liquid carrier includes polypropylene glycol and propylene carbonate.

5. A non-reactive high polymer slurry suspension comprising:
   a polymer;
   a liquid carrier;
   an organic derivative of clay; and
   a fibrous silicate material.

6. A suspension as claimed in claim 5 including:
   said fibrous silicate material being asbestos.

7. A suspension as claimed in claim 6 including:
   said polymer being polyacrylamide.

8. A suspension as claimed in claim 6 including:
   said polymer being poly(ethylene oxide).

9. A suspension as claimed in claim 6 including:
   the clay being an organic derivative of montmorillonite clay.

10. A suspension as claimed in claim 9 including:
    said asbestos being chrysotile asbestos.

11. A non-reactive high polymer slurry suspension consisting of:
    a polymer;
    a liquid carrier;
    dimethylbenzyloctadecyl ammonium hectorite; and
    chrysotile asbestos.

12. A suspension as claimed in claim 11 including:
    said polymer being polyacrylamide; and
    said carrier being propylene carbonate and tetrahydrofurfuryl alcohol.

13. A suspension as claimed in claim 12 wherein the ingredients are in the following proportions by weight:

| | |
|---|---|
| polyacrylamide | 35–40%; |
| propylene carbonate | 28–41%; |
| tetrahydrofurfuryl alcohol | 19–31%; |
| dimethylbenzyloctadecyl ammonium hectorite | 1–3%; and |
| chrysotile asbestos | .05–.5%. |

14. A suspension as claimed in claim 11 including:
    said polymer being polyacrylamide; and
    said carrier being kerosene; and
    a wetting agent.

15. A suspension as claimed in claim 14 wherein the ingredients are in the following proportions by weight:

| | |
|---|---|
| polyacrylamide | 45–55%; |
| kerosene | 39–49%; |
| dimethylbenzyloctadecyl ammonium hectorite | 2–3.5%; |
| chrysotile asbestos | .05–.5%; and |
| wetting agent | 2–3%. |

16. A suspension as claimed in claim 11 including:
    said polymer being polyacrylamide;
    said carrier being kerosene and propylene carbonate; and
    an emulsifying agent.

17. A suspension as claimed in claim 16 wherein the ingredients are in the following proportions by weight:

| | |
|---|---|
| polyacrylamide | 35–40%; |
| propylene carbonate | 54–59%; |
| dimethylbenzyloctadecyl ammonium hectorite | 1–2.5%; |
| chrysotile asbestos | .05–.5%; |
| kerosene | 2–3%; and |

| | |
|---|---|
| emulsifying agent | .5-1%. |

18. A suspension as claimed in claim 11 including:

said polymer being poly(ethylene oxide);

said carrier being kerosene; and a wetting agent.

19. A suspension as claimed in claim 18 wherein the ingredients are in the following proportions by weight:

| | |
|---|---|
| poly(ethylene oxide) | 25-35%; |
| kerosene | 58-70%; |
| dimethylbenzyloctadecyl ammonium hectorite | 1.5-2.5%; |
| chrysotile asbestos | 0.05-.5%; and |
| wetting agent | 2-4%. |

* * * * *